United States Patent [19]

Avril

[11] Patent Number: 5,405,451
[45] Date of Patent: Apr. 11, 1995

[54] METHOD FOR ARRESTING DETERIORATION OF CONCRETE VEHICLE PARKING STRUCTURES

[75] Inventor: Arthur C. Avril, Cincinnati, Ohio

[73] Assignee: A and T Development Corporation, Cincinnati, Ohio

[21] Appl. No.: 198,475

[22] Filed: Feb. 18, 1994

Related U.S. Application Data

[63] Continuation-in-part of Ser. No. 960,587, Oct. 13, 1992, Pat. No. 5,288,334.

[51] Int. Cl.⁶ ............................................. B08B 3/02
[52] U.S. Cl. ..................................... 134/34; 134/27; 134/42
[58] Field of Search ................. 134/27, 29, 32, 34, 134/36, 42

[56] References Cited

U.S. PATENT DOCUMENTS

| | | | |
|---|---|---|---|
| 2,177,987 | 10/1939 | Kelly | 15/123 |
| 2,936,770 | 5/1960 | Emanuel | 134/123 |
| 3,210,207 | 10/1965 | Dodson et al. | 106/90 |
| 3,529,999 | 9/1970 | Boeniger | 134/2 |
| 3,753,777 | 8/1973 | Thomsen et al. | 134/6 |
| 3,795,254 | 3/1974 | Blosser | 134/123 |
| 4,076,868 | 2/1978 | Roth et al. | 427/348 |
| 4,092,109 | 5/1978 | Rosenberg et al. | 21/2.5 R |
| 4,153,473 | 5/1979 | Rosenberg et al. | 134/5 |
| 4,295,243 | 10/1981 | King | 15/320 |
| 4,551,481 | 11/1985 | Smith et al. | 521/52 |
| 4,719,932 | 1/1988 | Burton | 134/57 R |
| 4,726,388 | 2/1988 | Swinehart et al. | 134/45 |
| 4,794,938 | 1/1989 | Petit | 134/57 R |
| 4,822,431 | 4/1989 | Bricher et al. | 134/28 |
| 4,845,794 | 7/1989 | Korski et al. | 15/51 |
| 4,889,147 | 12/1989 | Chandler | 134/123 |
| 4,922,572 | 5/1990 | Kohl et al. | 15/320 |

*Primary Examiner*—Melvyn J. Andrews
*Assistant Examiner*—Saeed T. Chaudhry
*Attorney, Agent, or Firm*—Wood, Herron & Evans

[57] ABSTRACT

A system and a method are disclosed for controlling structural deterioration of a vehicle parking structure by arresting deterioration caused by road salt erosion and corrosion of concrete floors and reinforcing steel in that structure. The invention includes spray washing the underside of vehicles prior to entry into the parking structure to remove road salt and thereby reduce road salt corrosive action within the facility. The invention further comprises arresting corrosion due to road salt which already has penetrated the concrete floors within the parking structure by the application of a chemical detergent which neutralizes the road salt that previously has penetrated the concrete. The chemical detergent may include a material having galvanic characteristics, such as metallic particles, which are believed to aid in inhibiting corrosion of the reinforcing steel.

6 Claims, 4 Drawing Sheets

METHOD FOR ARRESTING DETERIORATION OF CONCRETE VEHICLE PARKING STRUCTURES

CROSS-REFERENCE TO RELATED APPLICATIONS

This application is a continuation-in-part of application Ser. No. 07/960,587, filed Oct. 13, 1992, now U.S. Pat. No. 5,288,334, issued Feb. 22, 1994.

FIELD OF THE INVENTION

The present invention relates to a system and a method for arresting deterioration of concrete floors and reinforcing steel in a vehicle parking structure.

BACKGROUND OF THE INVENTION

Vehicle parking structures are constructed primarily of concrete reinforced with steel. In regions of the country where road salts, particularly sodium and calcium salts, are used to de-ice streets and roadways, concrete parking facilities are exposed to a great deal of salt and salt water carried by vehicles which enter and use the parking structures.

The deleterious effects of road salt on reinforced concrete parking structures due to erosion and corrosion are well documented. The deterioration and failure of concrete parking structures is believed due to corrosion of the structure's reinforcing steel, and erosion of the concrete, caused by the alkaline road salts.

In structures which utilize post-stressed reinforcing steel elements, which is quite commonly used, the reinforcing steel is typically exposed to road salts at the perimeter of the structure and thus is susceptible to corrosion from road salt water that flows over the edges of the concrete floor slabs. In the case of unexposed reinforcing steel, the road salt water is believed to penetrate the concrete itself, causing erosion of the concrete floor slabs, as well as corrosion of the steel reinforcements embedded therein. Furthermore, the parapet walls and barricades used in parking structures are typically mounted on vertical support rods which extend upwardly from the concrete floor slabs. Since there is typically a gap between the horizontal floor slabs and the vertical walls or barricades, the road salt water may seep or flow therebetween and attack the support rods holding the walls in place.

Currently there are approximately 14,000-20,000 vehicle parking structures in the United States alone, and new facilities are being constructed all the time. The repair and reconstruction of existing facilities due to road salt corrosive deterioration is time consuming, expensive, and disruptive to continued usage of the facility. Meanwhile, in the construction of new facilities, attempts are being made to combat the problems associated with road salt corrosion by the use of new materials. However, since the newest technologies are relatively recent developments, their efficacy in long-term resistance to corrosive and erosive attack by road salt is not known.

Additional problems encountered in parking structures, particularly in the areas where vehicles are parked, are the oil spots and stains which develop from oil that drips from parked vehicles. Such oil spots are both unsightly and may present safety problems since they tend to be slippery, and thus it is necessary to clean and remove these spots as part of the facility maintenance program.

The system and method of the present invention are intended to arrest the deterioration problems experienced in concrete parking facilities due to road salt exposure, while at the same time providing for the removal of oil spots, all in an economical, effective and relatively undisruptive manner.

SUMMARY OF THE INVENTION

In its broadest application, the present invention is directed to a system and method which arrests concrete deterioration of vehicle parking structures due to road salt erosion and corrosion. An ancillary purpose and benefit of the present invention is the removal of oil stains in parking structures caused by vehicles parking therein. The invention is equally applicable to both new and existing vehicle parking structures.

The system of the present invention comprises means for spray washing the underside of vehicles prior to entry into the parking structure so as to remove road salt which has accumulated on the underside of the vehicles while traveling on salted roadways. This serves to reduce corrosive action within the facility since the washed off road salt is not carried into the parking structure.

The system further comprises means for arresting corrosion due to road salt that has already penetrated the concrete floors or slabs in the parking structure over a period of years. This is accomplished by the periodic application of an effective amount of a chemical detergent formulation which penetrates into the concrete where it is believed to neutralize the road salt which has penetrated into the concrete to thereby arrest the corrosive action thereof, and which also can be used for the dual function of removing oil spots from the concrete floor's surface. The detergent formulation may include sub-micron sized particles having galvanic properties, such as certain metallic particles, which are believed to aid in inhibiting corrosion of the reinforcing steel.

A further aspect of the present invention is the application of coving at the intersection of the horizontal concrete floor slabs and the vertical parapet walls or barricades to fill any gaps which may be present. This will minimize the flow of road salt or salt water between the slabs and walls so as to minimize the attack of road salt on exposed reinforcing steel and support rods.

It is believed that the combination of vehicle underbody washing prior to entry into the parking structure, the chemical detergent solution application on the concrete floors within the structure, and the coving will have the combined effect of substantially arresting deterioration of concrete floors and reinforcing steel in vehicle parking structures which would otherwise occur in response to the action of corrosive road salts.

These and other objects and advantages of the present invention will become apparent to persons skilled in the art upon reading the detailed description in connection with the accompanying drawings.

DETAILED DESCRIPTION OF THE INVENTION

The purposes of the present invention are: 1) to minimize exposure of concrete floors and reinforcing steel inside parking facilities to road salt carried on vehicles, and thereby arrest the deterioration of concrete vehicle parking structures caused by action of the road salt; 2) to arrest the deterioration of such structures by road salt which has previously been carried into the structures by vehicles; and 3) to remove oil stains from the concrete floor surfaces in the structures. In the present invention, the first purpose is achieved by utilization of a spray wash system, and the second and third purposes are achieved jointly by application of an effective amount of a suitable chemical formulation to the concrete floor slabs in the parking structure.

Figure 1:
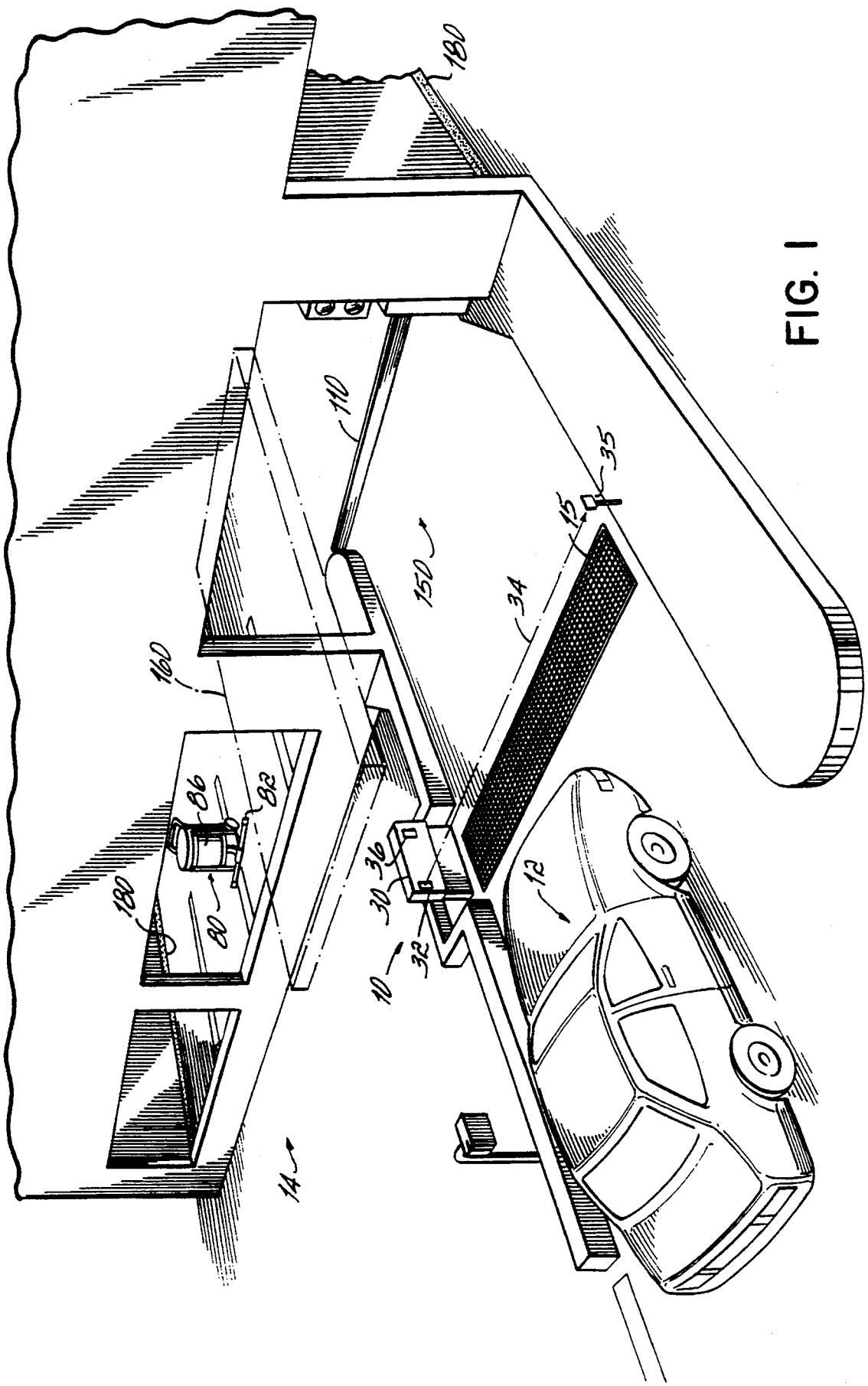
FIG. 1 is a perspective view of the entry to a vehicle parking structure embodying various aspects of the present invention.
Figure 2:
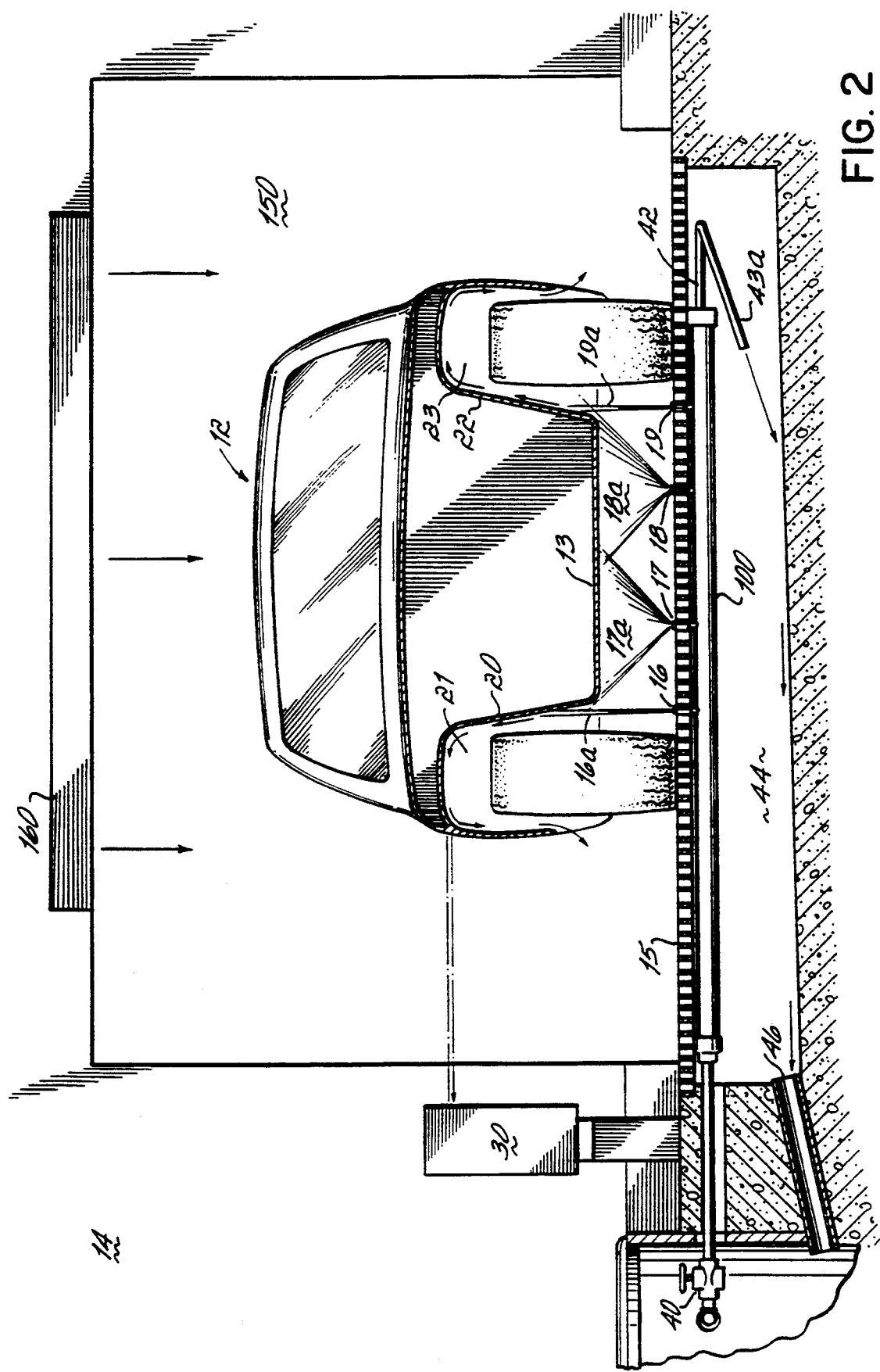
FIG. 2 is a diagrammatic cross-sectional view showing a vehicle at the entrance to a parking structure and being subjected to treatment according to the present invention.

FIGS. 1 and 2 show a vehicle 12 just prior to entry into a parking structure 14. A spray wash system 10, upon activation, spray washes the underside 13 of vehicle 12 as it travels across grating 15. As discussed above, the purpose of spray wash system 10 is to remove road salt which has accumulated on the underside 13 of vehicles 12 entering parking facility 14. This will arrest any further exposure of the concrete and reinforcing steel in the structure to road salt, and thus will minimize further deterioration thereof.

Figure 3:
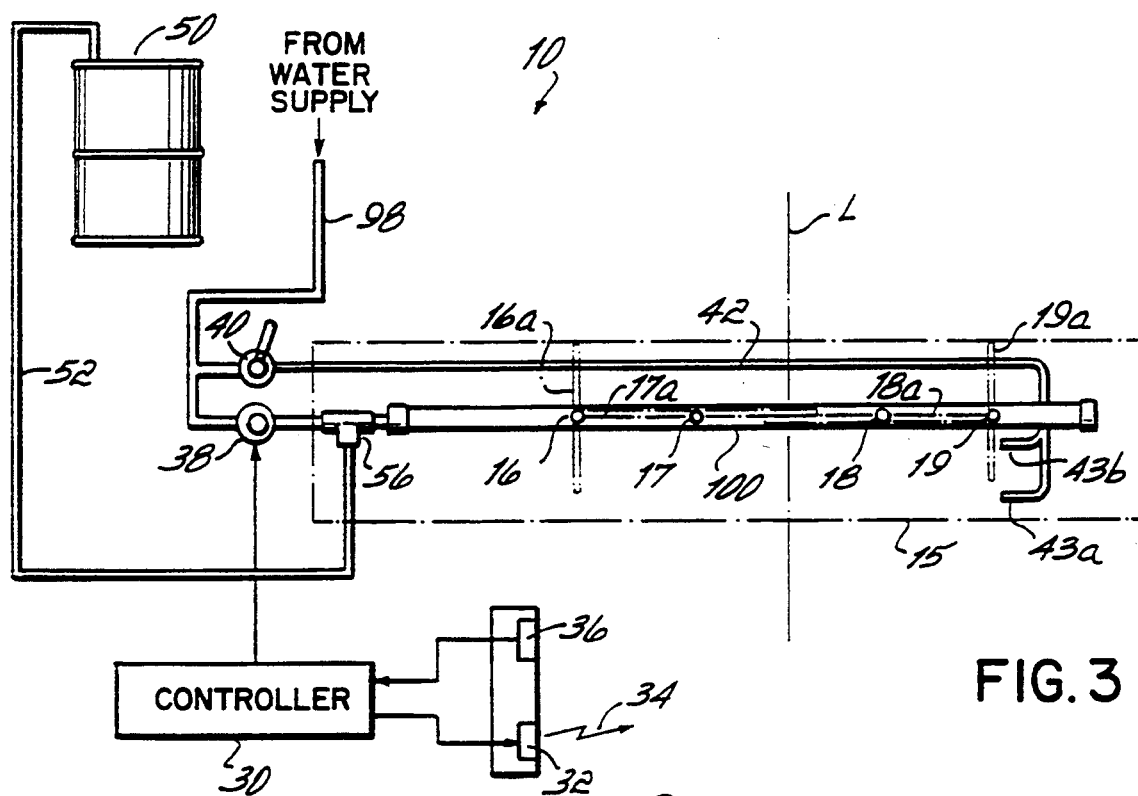
FIG. 3 is a schematic representation of the washing system portion of the present invention.

As shown particularly in FIG. 2 and schematically in FIG. 3, spray wash system 10 directs water against the underside of the vehicle from four spray nozzles 16, 17, 18, 19 in supply line 100. Nozzles 16 and 19 each discharge a fan-shaped spray 16a and 19a, respectively, at a location adjacent the inner edges 20 and 22, respectively, of vehicle wheel wells 21 and 23. The water spray action generally follows the contour of the wheel wells, as represented by the arrows, and rinses road salt from each wheel well of vehicle 12. It will be understood that only the rear set of wheel wells are visible in FIG. 2, but the spray wash system 10 serves to spray wash the front set of wheel wells in like manner.

The spray patterns discharged from nozzles 16 and 19 are shown in phantom in FIG. 3 as fan-like sprays 16a, 19a, respectively, which are oriented substantially parallel to the longitudinal axis L of a vehicle traversing the spray wash system 10. The discharge patterns from spray nozzles 17 and 18 are also shown in phantom in FIG. 3, and are generally fan-like sprays 17a and 18a, which are oriented substantially perpendicular to the longitudinal axis L of vehicle 12. The spray patterns 17a and 18a are intended to overlap slightly at the centerline of the vehicle, as shown, and to extend transversely to approximately the location of sprays 16a and 19a. These sprays 16a and 19a may be angled slightly forward of vertical, if desired. It should be appreciated that the particular distribution, orientation and shape of sprays are not critical to the practice of the present invention so long as the purpose of spray washing substantially the entire underbody of each vehicle is achieved. Furthermore, it is advantageous that the spray system be designed so that liquid is not sprayed onto the front, sides or rear of the vehicles, thus reducing the likelihood of freezing locks, etc. Thus, the entire underbody 13 of vehicle 12 will be spray washed to remove road salt therefrom prior to entering parking structure 14.

The operation of spray wash system 10 will now be described again with reference to FIGS. 1-3. System 10 is provided with an activator and control mechanism 30 which is designed to control the supply of liquid to feed line 100 and spray nozzles 16–19 so that liquid is only sprayed when a vehicle 12 is over the spray nozzles. This is accomplished by the use of proximity switches, such as photoelectric sensors which are commercially available from Allen-Bradley Company, Presence Sensing Products Division, 265 Winton Street, Waltham, Mass. 02154, which are based on the reflection of a light beam, preferably a non-visible IR beam.

In the particular embodiment shown, a first sensor 32, which acts as an on/off switch, constantly emits a light beam 34 toward a reflector 35 during periods of operation of the entire system. When beam 34 is "broken" and thus not reflected back toward sensor 32, as when a vehicle passes through the system, sensor 32 activates sensor 36 which in turn emits a light beam (not shown). When vehicle 12 travels forward and "breaks" the beam emitted from sensor 36, sensor valve 38 is activated and this opens the flow of liquid to feed line 100 and nozzles 16–19. Thus, when a vehicle is in the path of both beams the system is in operation spraying the vehicle underbody. As the rearwardmost portion of vehicle 12 clears beam 34, so that the beam is no longer "broken" and thus is reflected toward sensor 32 by reflector 35, sensor 36 is de-activated or shut-off and no longer emits a light beam. This, in turn, results in de-activation of valve 38 and thus stops the flow of liquid to feed line 100 and nozzles 16–19. Utilizing an arrangement as described above prevents inadvertent or undesirable activation and spraying of liquid such as when a person walks past/through the system.

It will be appreciated that alternative mechanisms can be used to control the flow of liquid to the spray system 10. For example, a suitable field coil (not shown) embedded in the concrete could be used to control the fluid flow. Additionally, operation and control of lift gate 110, which controls entry/exit to parking structure 14, can be tied into the liquid supply control mechanism.

In a preferred embodiment of spray system 10, the liquid which is used to wash the underside of vehicle 12 entering parking structure 14 is water supplied from any suitable source via line 98 and which preferably includes a non-corrosive, or corrosion inhibiting additive. This additive is supplied from a reservoir 50 via supply line 52. The additive is drawn into feed line 100 by means of a siphoning action caused by the flow of water through induction injector 56. The flow rate of the chemical additive is controlled by means of a double set screw needle valve in induction injector 56. Other suitable valves may be used to control the flow of the chemical additive, the composition of which will be described below.

As shown in FIGS. 2 and 3, a portion of spray system 10 (including spray nozzles 16–19 and liquid feed line 100) are contained in cavity 44 below ground level, and are covered and protected by grating 15. Periodically, it is necessary to flush any dirt, salt or other debris from cavity 44 which may have accumulated therein. This can be accomplished by manually (or otherwise) activating (opening) valve 40 which causes water to flow through and be discharged from line 42 via outlet tubes 43a and b. The water and other material flows in the direction of the arrows shown in FIG. 2, and is discharged to a sewer or other disposal means via drain pipe 46.

The entry region 150 to parking structure 14, also shown diagrammatically in FIG. 2, may be provided with overhead heating elements 160, such as infrared lamps, for a distance of 10'-30' subsequent to the wash system 10. The heating elements will aid in preventing ice formation from the water solution which drips off the vehicles as they enter the structure subsequent to washing, and will aid in melting snow and ice which has accumulated around the spray wash system 10.

Figure 4:
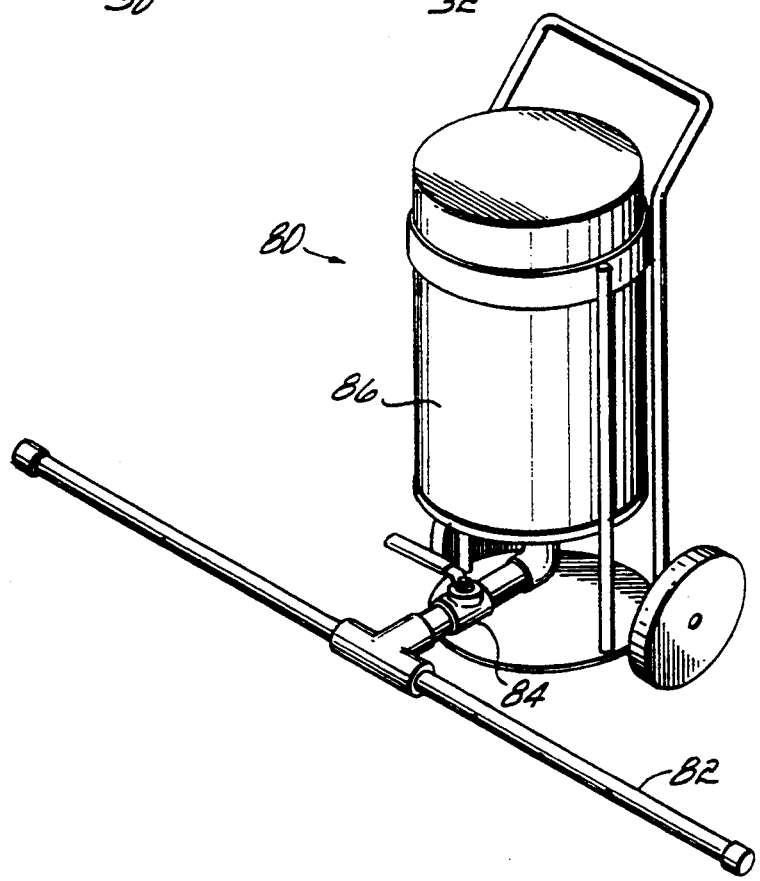
FIG. 4 is a perspective view of one embodiment of an applicator for the chemical solution used in the practice of the present invention.
Figure 5:
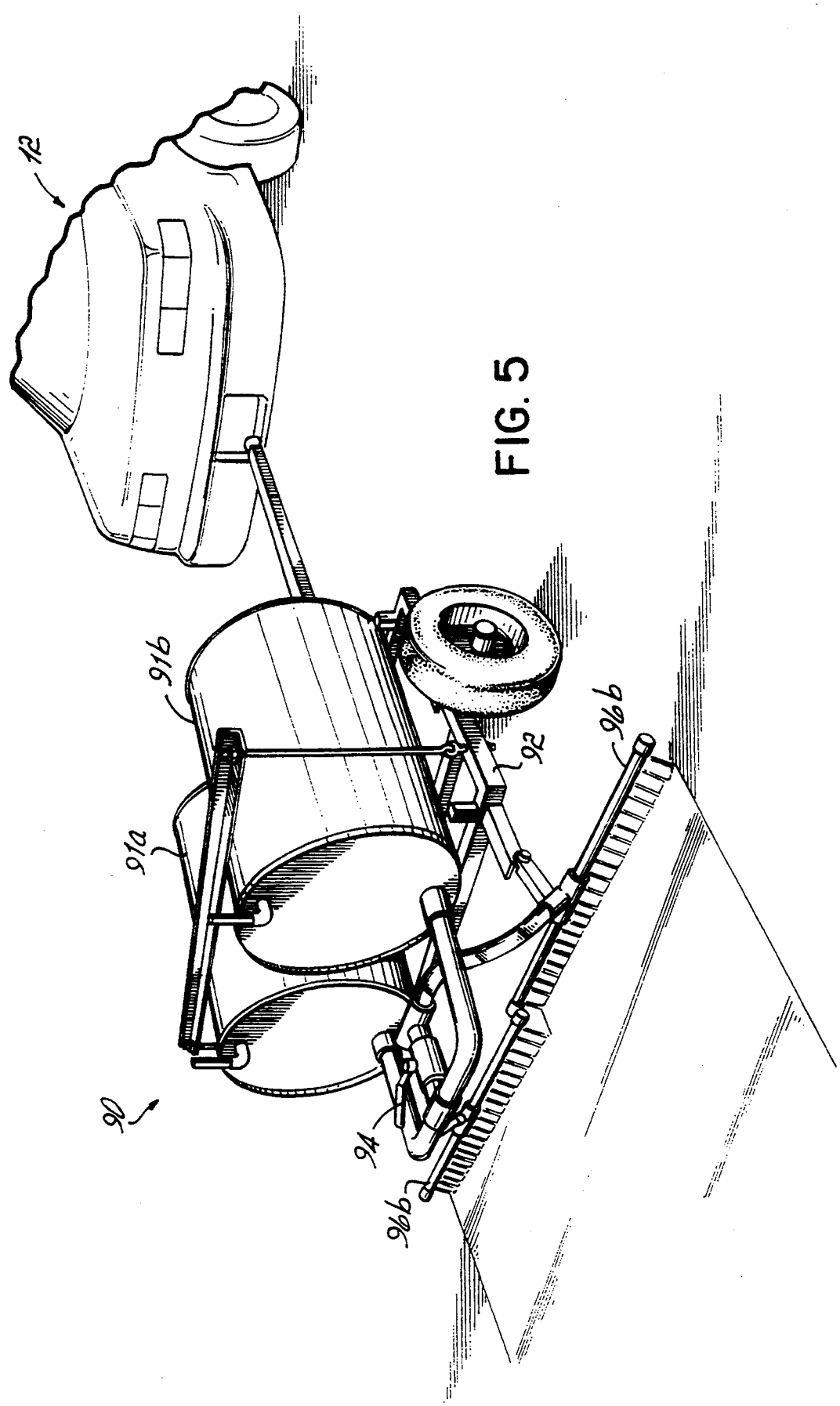
FIG. 5 is a perspective view of an alternative embodiment of a chemical solution applicator used in the practice of the present invention.

An additional aspect of the present invention accomplishes the second and third purposes of the system, which are the arrest of deterioration of the structure 14 by road salt which has been previously carried into the structure, and the removal of oil spots from the floor slabs. To accomplish these goals, a chemical formulation (described below) is applied to the concrete floor surfaces in the parking structure upon which vehicles are parked. Although the solution may be applied in any suitable manner, FIG. 4 shows a dispenser 80 which has been developed specifically for this purpose. Dispenser 80 is a hand-operated, wheeled cart which includes a liquid reservoir 86, sprinkler pipe 82, and a valve 84, which controls the liquid flow to sprinkler pipe 82. Utilizing dispenser 80, the desired chemical formulation may be applied to the floor surface. Alternatively, the dispensing apparatus 90 shown in FIG. 5 may be used to dispense the chemical solution. The apparatus shown in FIG. 5 is preferably towed by a vehicle 12, which may or may not be a passenger vehicle. Dispenser 90 includes dual tanks 91a and 91b for the liquid composition which ride on a suitable trailer 92. The flow of liquid is controlled by valve 94, and the liquid is dispensed via sprayer bars 96a and 96b.

The chemical formulation which is spread by dispenser 80, 90, or any other suitable dispensing apparatus, is then brushed into the concrete by means of a hand broom or a mechanical scrubber unit (not shown) to blend the chemical formulation and oil into a solution which is then allowed to stand on the concrete for up to several hours (depending on the age of the oil spots). Thereafter, the floor is flushed with water which serves to emulsify the solution and substantially remove the oil spots. A portion of the emulsified mixture, which contains anionic surfactants and calcium nitrite is believed to neutralize the salt on the surface of the concrete, as well as that which has previously penetrated the concrete, to thereby gradually arrest the erosion and corrosion of both the concrete and the reinforcing steel therein. Preferably, the concrete surface treatment should be repeated on a periodic basis, such as annually or semi-annually, to remove new oil spots and to propagate the neutralization of absorbed and surface salts.

The preferred chemical formulation for use as the oil remover and corrosion arresting solution is a mixture of (a) DCI, which is a corrosion inhibitor that is a liquid (aqueous) mixture containing calcium nitrite as its active ingredient, commercially available from the Grace Chemical Co. of Columbus, Ohio, and (b) FADE, which is an oil spot remover product commercially available from Sakrete, Inc. of Cincinnati, Ohio. FADE is a solvent-based non-ionic detergent which comprises about 20% low odor base solvent, such as is available from Ashland Oil, blended with the following components:

Triton X-45 (Rohm & Haas Surfactants)
Triton X-114 (Rohm & Haas Surfactants)
Ninate 401 (Stepan Chemical Company, Surfactant Dept., Northfield, Ill.), and ethylene glycol EB.

The latter four components are available as a concentrate from ChemCentral, Cincinnati, Ohio, under the product number 2254. It is contemplated that mixtures of between about 5%-25% DCI and about 75%-95% FADE are suitable in the practice of the present invention. Mixtures in these ranges are believed to exhibit suitable corrosion and erosion inhibiting properties.

In addition, the chemical formulation may include sub-micron sized particles or material having galvanic properties, such as certain types of metallic particles, which are believed to aid in inhibiting corrosion of the reinforcing steel used in the concrete. More particularly, zinc in sub-micron sized particles or powder is believed to be especially useful as a component of the chemical formulation. The metallic particles, which may be derived from a dust-collecting system utilized in the mining of non-ferrous metallic materials or other sources, have a relatively low apparent specific gravity and therefore tend to remain in suspension for an extended period of time. The metallic particles, specifically zinc particles, are electronically compatible with the reinforcing steel and may form a galvanic coating thereon which inhibits the steel from corroding. It is believed that the inclusion of material possessing galvanic properties or characteristics, particularly metallic particles, in the chemical formulation makes it possible to minutely increase the cross-sectional dimension of partially corroded reinforcing steel rods, thereby increasing their strength and longevity and revitalizing them.

The same chemical formulation described above for removing oil spots is preferably maintained in reservoir 50 of the water spray system for addition to the water sprayed on the vehicle underbodies. Utilizing the valve control in the induction injector 56, as described previously, the amount of chemical solution added to the water is preferably controlled to the level of about ½ oz. of solution per five gallons of water flow. Thus, the actual amount of the chemical solution sprayed on any given vehicle will depend upon the duration of the spray cycle, which in turn is dependent upon the speed at which the vehicle travels across spray system 10. Additionally, it has been found that spray system 10 may be effectively operated such that the spray output from nozzles 16-19 is approximately 25 gallons per minute at 80 psi. It is believed that the typical time required for a vehicle to traverse the spray system is about 12 seconds, and thus approximately 5 gallons of water (including ½ oz. of chemical solution) will be sprayed on each entering vehicle.

In a final aspect of the present invention, coving 180 is preferably applied to all joints between vertical walls or barricades and the horizontal concrete floor slabs. Coves 180 serve to prevent substantially any road salt or salt water from flowing between the floor and vertical wall structures to thereby further prevent corrosive deterioration of the vehicle parking structure. The coves are preferably formed of a rapid setting grout, such as RAPID BOND and RAPID SEAL commercially available from Sakrete, Inc. of Cincinnati, Ohio. Other suitable materials containing expansive and high aluminus cements and fine silica sand may be used.

Furthermore, the water used with the grout mixture may contain corrosion inhibiting additives, such as calcium nitrite to further aid in salt neutralization and corrosion inhibition.

The present invention, as described herein, is subject to variations and modifications which are within the scope of the invention as defined by the appended claims. None of the specific examples given herein are intended to be limiting in any way.

What is claimed is:

1. A method of arresting deterioration, due to the action of road salt, of concrete floors and reinforcing steel in a vehicle parking structure, said method comprising the steps of:

spray washing the underbody of vehicles prior to entry into said parking structure to remove road salt carried on said vehicle underbodies, thereby preventing deterioration of said concrete floors and reinforcing steel which would otherwise be caused by said road salt being carried into said parking structure, and periodically applying an effective amount of a detergent formulation containing sub-micron sized metallic particles having galvanic characteristics to said concrete floors so as to penetrate the concrete, whereby said formulation at least partially neutralizes road salt which previously has penetrated the concrete floors and said metallic particles at least partially coat said reinforcing steel, all in order to arrest structural deterioration of said concrete floors and reinforcing steel caused by road salt previously carried into said parking structure.

2. A method according to claim 1 wherein said metallic particles are sub-micron sized zinc particles.

3. A method according to claim 1 further comprising the step of applying coves in said parking structure at the intersection of vertical and horizontal concrete slabs to prevent the flow of road salt and salt water therebetween.

4. A method according to claim 1, said detergent formulation being applied to said concrete floor on an annual basis.

5. A method according to claim 1 further comprising the steps of brushing said detergent formulation onto said concrete floor, and thereafter flushing said concrete floor with water to form an emulsion which is effective to penetrate the concrete and neutralize the road salt which has penetrated the concrete.

6. A method according to claim 1 comprising the step of providing a corrosion inhibitor additive in a water solution for use in said spray washing step.

* * * * *